Patented July 4, 1950

2,514,192

UNITED STATES PATENT OFFICE 2,514,192

NEOPRENE CEMENT

William E. Tann, Akron, Ohio, assignor to The Firestone Tire & Rubber Company, Akron, Ohio, a corporation of Ohio No Drawing. Application February 27, 1947, Serial No. 731,405

2 Claims. (Cl. 260—79.5)

This invention relates to an improved neoprene (polymerized chloroprene) cement which contains a fast-acting accelerator or kicker formed from dibenzylamine and carbon disulfide, using an excess of the carbon disulfide over the amount required to react with the dibenzylamine to produce dibenzylammonium dibenzyl dithiocarbamate. The nature of the improvement will be more evident from what follows.

The cement may be prepared from any rubber-like polymerized chloroprene. The other materials compounded with the polymerized chloroprene in producing a cement may vary over a relatively large range. Different antioxidants, plasticizers, fillers, etc., may be employed. The following examples are illustrative:

Six different polymerized chloroprene mixtures were made by milling various ingredients into the rubber-like material according to the following formulae. In preparing the rubber mixtures, the rubber-like material known commercially as Neoprene GN was employed, but other neoprenes may be utilized, such as Neoprene CG, Neoprene KN, etc.

and additional solvent. The accelerator was prepared as follows:

| | Cc. |
|---|---|
| Dibenzylamine | 5 |
| Carbon disulfide | 15 |
| Yield | 20 |

Three hundred sixty cubic centimeters of the accelerator were added to one-half gallon of each of the six concentrated cements, and sufficient solvent was then added to bring the total to a gallon. Each of these cements thus diluted was employed for cementing together splices of suitable stock, and all were found to cure up at room temperature in a period from ten to fifteen days, depending upon temperature, etc., and to give a very satisfactory splice. Cements using carbon disulfide alone and other cements using dibenzylamine alone were found unsatisfactory. A crystalline product obtained from one mol of dibenzylamine and a half mol of carbon disulfide gave no activation. On using an excess of the carbon disulfide over the amount required for Samples

| | A | B | C | D | E | F |
|---|---|---|---|---|---|---|
| Zinc oxide | 8.5 | 8.375 | 3 | .9375 | 3 | 3 |
| Carbon black | 1.5 | 1.5 | 1.5 | | | |
| Stearic acid | .4375 | .4375 | | | .4375 | .4375 |
| Neozone C | .875 | .875 | .875 | 1.875 | .875 | .875 |
| Titanium oxide | | | | | | 5.1875 |
| Magnesium oxide | 3.375 | 3.375 | 4 | 3.6875 | 4 | 4 |
| Dye | | | | | | 1.0625 |
| Latac | .3125 | .4375 | .4375 | | | |
| Neoprene GN | 85 | 85 | 89.75 | 92.625 | 91.25 | 85 |

Neozone C is an antioxidant which is allegedly a mixture of 92.5 per cent phenyl alpha-naphthylamine and 7.5 per cent metatoluylene diamine. Any other neoprene antioxidant may be employed. Latac is a plasticizer composed of cyclohexamethylene imonium cyclohexamethylene dithiocarbamate. Any other plasticizer, such as piperidinium pentamethylene dithiocarbamate, may be utilized.

The neoprene stocks thus compounded were put into solution by dissolving 75 pounds of each stock with 20 gallons of solvent. This yielded 26.6 gallons of each of the cements. These concentrated cements were then treated with accelerator such crystallization, very rapid curing was obtained. Three parts by weight of carbon disulfide to one part of the amine gives good results.

From the above it appears that up to about 12 per cent of the accelerator by weight gives satisfactory results. A larger amount produces scorching. A lesser amount—for example, as little as 3 per cent—can be employed satisfactorily, but the curing will not be as rapid. Ordinarily, about 8 to 12 per cent by weight will be employed. Among the known solvents for the neoprene stock are benzene, toluene, xylene, and other aromatic hydrocarbon solvents, ethylene dichloride, trichloroethylene, and other chlorinated hydrocarbon solvents, as well as commercial mixed solvents for neoprene. The nature and amount of the other compounding ingredients present may be varied. The invention is defined in the appended claims.

What I claim is:

1. A quick-curing cement containing rubber-like polymerized chloroprene, a solvent for the same, zinc oxide, magnesium oxide, and as an accelerator 3 to 12 per cent by weight based on the weight of the polymerized chloroprene of the product of three parts by volume of carbon disulfide and one part by volume of dibenzylamine.

2. A quick-curing cement containing rubber-like polymerized chloroprene, a solvent for the same, and in substantial amount not exceeding 12% as accelerator, carbon disulfide and dibenzylamine in the ratio of three parts by volume of carbon disulfide to one part by volume of dibenzylamine.

WILLIAM E. TANN.

REFERENCES CITED

The following references are of record in the file of this patent:

UNITED STATES PATENTS

| Number | Name | Date |
| --- | --- | --- |
| 1,802,740 | Steinle | Apr. 28, 1931 |
| 2,395,493 | Miller | Feb. 26, 1945 |